Feb. 17, 1970     I. GRIFFEL     3,495,468

CHAIN DRIVE

Filed Nov. 21, 1968

INVENTOR.
*Irving Griffel*

BY *Ronald L. Phillips*

ATTORNEY

United States Patent Office 3,495,468
Patented Feb. 17, 1970

3,495,468
CHAIN DRIVE
Irving Griffel, Ann Arbor, Mich., assignor to General Motors Corporation, Detroit, Mich., a corporation of Delaware
Filed Nov. 21, 1968, Ser. No. 777,824
Int. Cl. F16h 7/06
U.S. Cl. 74—229         4 Claims

ABSTRACT OF THE DISCLOSURE

A chain drive having a sprocket wheel with random root relief for providing initial contact of the chain teeth tops with only the nonrelieved roots at a partial wrap of the chain on the sprocket wheel and with each sprocket having a guide surface on its drive side for preventing contact between the tops of the chain teeth and sprockets and guiding the chain teeth for root contact when the chain elongates to maintain substantially the same initial root contact location with chain elongation.

---

This invention relates to chain drives and more particularly to sprocket wheels having random root relief for noise reduction.

In chain drives, it is generally desirable that there be quiet operation. It is of particular importance in front wheel drive vehicles, for example, where a chain drive is used to drivingly connect the vehicle's engine to the transmission because of the close proximity of the chain drive to the passenger compartment.

It is known that chain drive noise can be effectively reduced by providing random sprocket root contact with the tops of the chain teeth to disperse noise over a wide frequency band. However, I have discovered that when the chain elongates sufficiently, the desired random root contact is not maintained resulting in restriction of the noise reduction effect.

According to my invention one of the sprocket wheels in the chain drive has nonrelieved and relieved roots for providing initial contact of the chain teeth tops with only the nonrelieved roots at a partial wrap of the chain on the sprocket wheel which, if maintained, effects noise reduction. To maintain the desired initial root contact location as the chain elongates, I have provided each of the sprockets with a discontinuous guide surface intersecting the sprocket's top and drive flank to prevent contact between the tops of the chain teeth and the sprockets when the chain elongates and smoothly guide the chain teeth tops onto the sprocket drive flanks for the root contact.

An object of the present invention is to provide a chain drive with noise reduction that is maintained on chain elongation.

Another object is to reduce the noise in a chain drive by providing a sprocket wheel having random root relief for initial chain-nonrelieved root contact and chain tooth guide surfaces for maintaining this random contact at the same angular sprocket wheel position on chain elongation.

Another object is to reduce the noise in a chain drive by providing one of the sprocket wheels with nonrelieved and relieved roots and a guide surface intersecting each sprocket top and drive flank to maintain initial contact if the chain tooth tops with only the nonrelieved roots at a predetermined partial wrap of the chain on the sprocket wheel as the chain elongates.

These and other objects will be more apparent from the following description and drawing in which.

Figure 1:
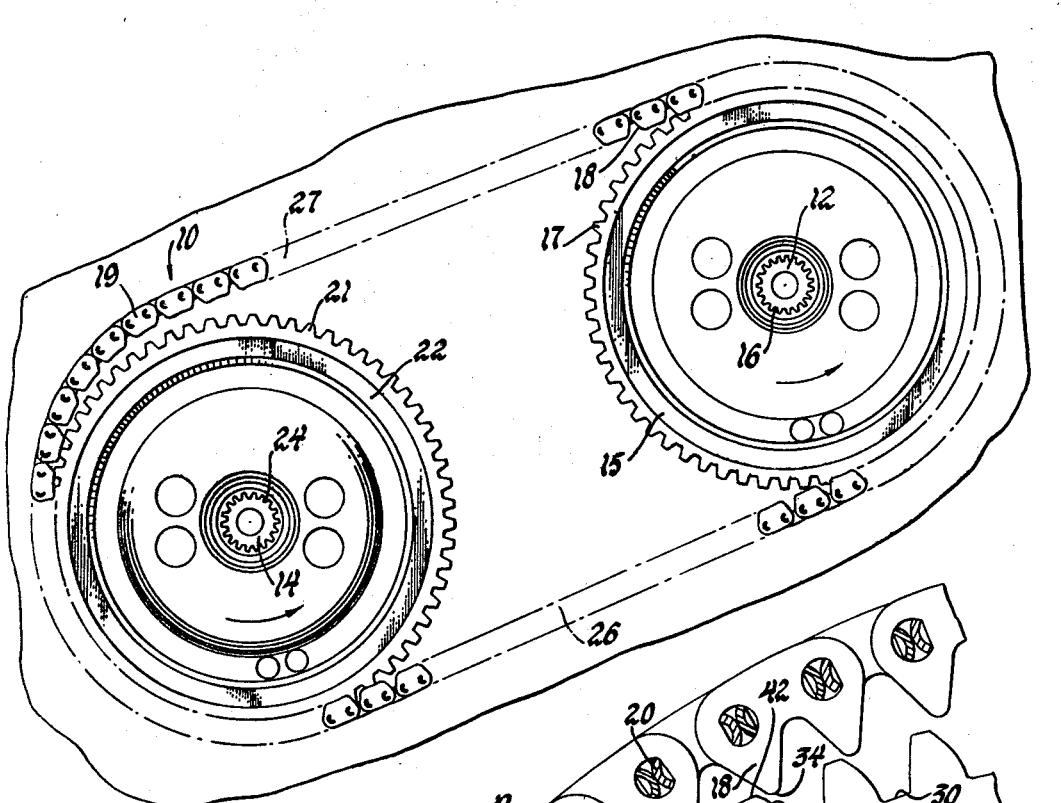
FIGURE 1 is an elevational view of a chain drive embodying the present invention.
Figure 2:
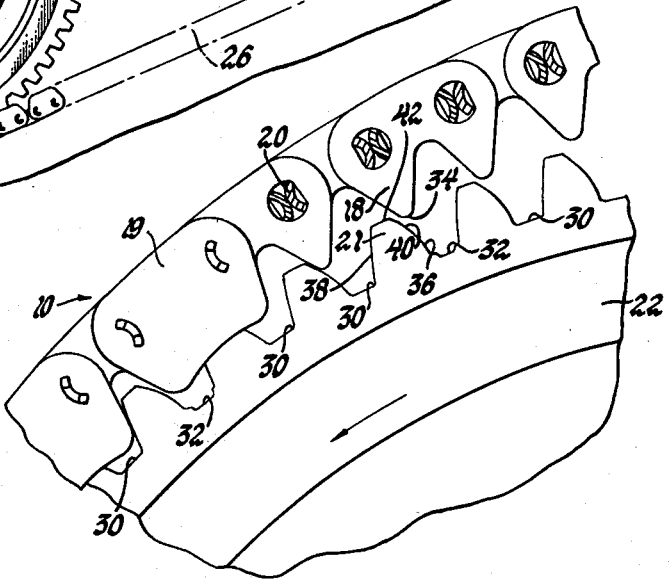
FIGURE 2 is an enlarged partial view of the chain and driven sprocket wheel shown in FIGURE 1.

Referring to FIGURE 1, a chain drive generally indicated at 10 is shown for use in a front wheel drive vehicle power train for drivingly connecting a hydrodynamic torque converter output shaft 12 to an automatic transmission input shaft 14, this power train being generally of the type shown in United States Patent No. 3,377,875 issued Apr. 16, 1968 to D. R. Sand and entitled "Chain Drive Power Transmitting Mechanism." The chain drive 10 generally comprises a drive sprocket wheel 15 having a spline connection 16 with the converter output shaft 12 and sprockets 17 meshing with teeth 18 of an endless chain 19. The chain 19 is a conventional type having the links pivotally connected by the double pivot pin connections 20 as best shown in FIGURE 2. The chain teeth 18 mesh with sprockets 21 of a driven sprocket wheel 22 which has a spline connection 24 with the transmission input shaft 14. In the preferred construction, the chain teeth 18 and the sprockets 17 and 21 of the sprocket wheels have involute profiles. In this installation the sprocket wheels are of the same size with identical numbers of sprockets and the drive sprocket wheel 15 rotates counterclockwise with side 26 of the chain being tensioned or loaded to drive the driven sprocket wheel 22 counterclockwise at the same speed, the opposite chain side 27 thus being untensioned or slack. These rotational directions are indicated by the arrows.

Figure 3:
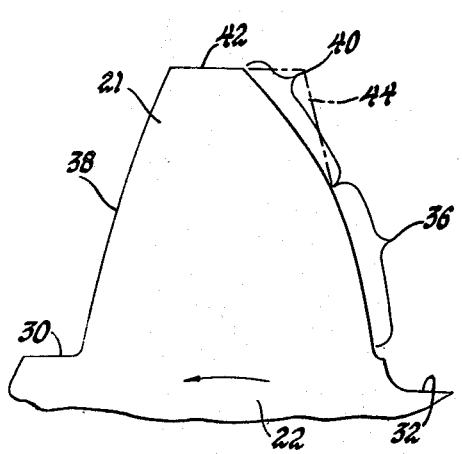
FIGURE 3 is an enlarged view of one of the sprockets of the driven sprocket wheel.

For the purpose of providing noise reduction and as best shown in FIGURES 2 and 3, one of the sprocket wheels, preferably the driven sprocket wheel 22, has a random distribution of nonrelieved roots 30 and cutaway or relieved roots 32, i.e. roots 30 have a larger root diameter than roots 32. The diameter of the nonrelieved roots 30 is sufficiently large so that during drive transmittal, the chain teeth tops 34 may contact the nonrelieved roots 30 but not contact the relieved roots 32. In the preferred construction only the nonrelieved roots 30 have a ground surface. In operation and assuming at this point that the sprockets 21 have a continuous normal involute surface on their drive sides, each initial chain tooth top-nonrelieved root contact occurs after an approaching chain tooth 18 on the slack side 27 engages and slides down the drive flank 36 on the drive side of a sprocket 21 adjacent a nonrelieved root 30, the opposite flank 38 of sprockets 21 being on the coast side. This random root contact breaks up the mesh frequency and disperses the resultant noise excitation forces over a band of frequencies thereby reducing the noise that would otherwise be emitted by the inherently sharply tuned sound propulsing structure in an unaltered chain drive. The aforementioned patent, Sand 3,377,875, shows a similar form of random root relief.

I have found that with the above described random root relief, the first or initial root contact will normally take place at approximately two-thirds (⅔) wrap of the chain on the driven sprocket wheel, this figure being approximate because it is a function of chain elongation with the root contact occurring later or at more wrap with increasing chain elongation. I have further found that more effective noise dispersion and thus more noise reduction is provided by widening the frequency band and that this may be accomplished by having the initial root contact occur earlier, preferably in the first half of chain wrap on the driven sprocket wheel.

I have found that the reason for the normally late root contact is that when the chain is elongated as a result of load, centrifugal force forces the elongated chain outward on its slack side as shown in FIGURE 1 in its approach for engagement with the driven sprocket wheel. This causes the chain teeth to contact the drive flanks at higher points with increasing chain elongation; and with sufficient chain elongation, the chain teeth tops eventually make contact with the large sprocket tops of the normal involute sprockets. Thus, the distance the chain teeth have to travel for contact with the nonrelieved roots increases with chain elongation and with sufficient elongation they contact the tops of the sprockets and are required to make a step prior to riding down the drive flanks for the root contact. Because of these variations in the distance the chain teeth must travel for root contact, the location of the initial chain tooth top-nonrelieved root contact is variable and occurs late or near the end of chain wrap on the driven sprocket with the root contact being pronounced following a chain tooth step off a sprocket top. Thus, the noise dispersion effects available from the random root relief are restricted by the chain elongation.

To maintain the same location of initial chain tooth top-nonrelieved root contact and have it occur in the first half of chain wrap on the driven sprocket wheel, all of the sprockets 21 of the driven sprocket wheel 22 are provided as best shown in FIGURES 2 and 3 with a discontinuous smooth guide surface 40 intersecting the sprocket top 42 and drive flank 36. The guide surface 40 is provided by chamfering or cutting away the tip of the involute as shown in FIGURE 3, the cut-away portion being indicated at 44.

The smooth guide surfaces 40 may be generated surfaces like the involute flanks of the sprockets and are preferably also involutes having a base circle diameter smaller than that of the flanks. By this provision of the guide surfaces 40, the tops of the chain teeth 18 are prevented from contacting the now narrow tops 42 of the sprockets 21 and are provided with a smooth and shorter path to the root region by the guide surface 40 instead of a stepped path. This establishes the initial chain tooth top-nonrelieved root contact location in the first half of chain wrap on the driven sprocket which location is maintained by the prevention of chain tooth top-sprocket top contact on chain elongation.

I claim:
1. In a chain drive the combination of a chain having teeth meshing with a sprocket wheel; said sprocket wheel having nonrelieved and relieved roots for providing initial contact of the chain tooth tops with only said nonrelieved roots at a predetermined partial revolution of said chain with said sprocket wheel; and all of the sprockets having guide means for smoothly guiding the chain tooth tops onto the sprocket drive flanks while preventing contact between the tops of the chain teeth and sprockets when said chain elongates so that the initial contact of the chain tooth tops with only said nonrelieved roots is maintained at substantially the same predetermined partial revolution of said chain with said sprocket wheel as said chain elongates.

2. The chain drive set forth in claim 1 and said guide means and the flanks of said sprockets having involute surfaces developed from different base circle diameters.

3. A sprocket wheel having nonrelieved and relieved roots, and each sprocket having a discontinuous guide surface intersecting the sprocket's top and drive flank.

4. The sprocket wheel set forth in claim 3 and said guide surfaces and the sprocket flanks having involute surfaces developed from base circles having different diameters.

References Cited
UNITED STATES PATENTS 3,237,475   3/1966   Mattson et al. _____ 74—457
3,377,875   4/1968   Sand _____ 74—229

JAMES A. WONG, Primary Examiner

U.S. Cl. X.R.
74—243, 443, 462